US012639190B2

(12) United States Patent
Penso et al.

(10) Patent No.: US 12,639,190 B2
(45) Date of Patent: May 26, 2026

(54) VOLUME-EFFICIENT TELEMETRY

(71) Applicant: MELLANOX TECHNOLOGIES, LTD., Yokneam (IL)

(72) Inventors: Yacob Penso, Ashdod (IL); Ran Sandhaus, Tel Aviv (IL); Vladimir Shalikashvili, Petah-Tiqwa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 50 days.

(21) Appl. No.: 18/733,072

(22) Filed: Jun. 4, 2024

(65) Prior Publication Data

US 2025/0370901 A1     Dec. 4, 2025

(51) Int. Cl.
*G06F 11/34* (2006.01)
*G06F 11/30* (2006.01)
*G06F 16/901* (2019.01)
*G06F 16/906* (2019.01)

(52) U.S. Cl.
CPC ...... *G06F 11/3466* (2013.01); *G06F 11/3006* (2013.01); *G06F 16/9024* (2019.01); *G06F 16/906* (2019.01)

(58) Field of Classification Search
CPC ............. G06F 11/3466; G06F 11/3006; G06F 11/3409
USPC ........................ 714/10, 4.1, 43, 44, 26, 47.1
See application file for complete search history.

(56) References Cited

U.S. PATENT DOCUMENTS

| | | | |
|---|---|---|---|
| 10,284,383 B2 | 5/2019 | Bloch et al. | |
| 11,196,586 B2 | 12/2021 | Graham et al. | |
| 12,368,747 B1 * | 7/2025 | Singh .................. | H04L 63/1425 |
| 2018/0026910 A1 * | 1/2018 | Balle ..................... | G06F 3/0665 |
| 2018/0173734 A1 * | 6/2018 | Kripalani ................ | G06F 11/00 |
| 2021/0216412 A1 * | 7/2021 | Navon .................. | G06F 3/0653 |
| 2024/0296105 A1 * | 9/2024 | Gal-On .............. | G06F 11/3476 |
| 2025/0254108 A1 * | 8/2025 | Thiruchengode Vajravel ............ H04L 41/5009 |

FOREIGN PATENT DOCUMENTS

EP          3808099 B1 * 12/2024  .......... G06F 11/3668

* cited by examiner

*Primary Examiner* — Chae M Ko
(74) *Attorney, Agent, or Firm* — Sheridan Ross P.C.

(57) ABSTRACT

Embodiments of the present disclosure are directed to sampling telemetric values of computing devices in an efficient manner. Generally speaking, embodiments described herein are directed to sampling counters and gauges of computing devices in a network, data center, etc. in a way that reduces redundant and non-informative signals, while being adaptive when sampling with high granularity desirable. According to one embodiment, counters can be correlated with each other, sharing residual information, and therefore, sampling only a subset of them, or a "representative" can be sufficient in representing a current state. When there is a notable change in the representative, the telemetry sampling procedure can increase its granularity and sample not only the representative but also the underlying group of telemetric values.

20 Claims, 6 Drawing Sheets

1005

Read time series
for telemetric value

1010

Apply M-L
clustering
algorithm

1015

Identify centroid of
cluster(s)

1020

Select centroid(s)
as
representative(s)

VOLUME-EFFICIENT TELEMETRY

FIELD OF THE DISCLOSURE

The present disclosure is generally directed to monitoring computing devices in a network and more particularly to sampling telemetric values of computing devices in an efficient manner.

BACKGROUND

Datacenter networks are becoming faster, bigger, and more complex. As a result, telemetry & events are critical for gaining observability, error detection, and ML-based predictive maintenance. This requires a monitoring & telemetry solution to inspect, debug, and tune the network. Counters and gauges sampled from the network devices are an important pillar in this monitored information, however as data centers are getting bigger and more complex, more telemetry is required, both in terms of the number of components to monitor and the number of telemetry counters to collect. This comes with a cost, being that increased CPU effort or higher telemetry network bandwidth. Hence, there is a need in the art for improved methods and systems for sampling and collecting telemetry while reducing redundancy and while not missing important signals.

BRIEF SUMMARY

Embodiments of the present disclosure are directed to sampling telemetric values of computing devices in an efficient manner. Generally speaking, embodiments described herein are directed to sampling counters and gauges of computing devices in a network, data center, etc. in a way that reduces redundant and non-informative signals, while being adaptive when sampling with high granularity desirable. According to one embodiment, counters can be correlated with each other, sharing residual information, and therefore, sampling only a subset of them, or a "representative" can be sufficient in representing a current state. When there is a notable change in the representative, the telemetry sampling procedure can increase its granularity and sample not only the representative but also the underlying group of telemetric values.

According to one embodiment, a telemetry monitor device can comprise a communication interface coupled with a communication network and a control circuit controlling operation of the telemetry monitoring device. The control circuit can cause the telemetry monitoring device to identify a representative telemetric value for two or more telemetric values collected from computing devices coupled with the communication network.

According to one aspect, identifying the representative telemetric value for two or more telemetric values collected from the computing devices can comprise defining a graph representing the two or more telemetric values, wherein the graph comprises a plurality of nodes representing the two or more telemetric values and one or more edges connecting the plurality of nodes, and wherein each edge represents a correlation between the plurality of nodes. One or more cliques within the graph can be identified based on the correlation between the plurality of nodes represented by the edges of the graph and the representative telemetric value for two or more telemetric values collected from the computing devices can be identified based on the identified one or more cliques.

According to another aspect, identifying the representative telemetric value for two or more telemetric values collected from the computing devices can be based on machine learning-based clustering of the two or more telemetric values.

According to another aspect, identifying the representative telemetric value for two or more telemetric values collected from the computing devices can comprise receiving a definition of the representative telemetric value from a domain expert.

According to another aspect, identifying the representative telemetric value for two or more telemetric values collected from the computing devices further comprises identifying a representative telemetric value of two or more representative values in each of a plurality of hierarchical levels.

One or more telemetric values can be sampled from the representative telemetric value of the two or more computing devices in each of the plurality of groups and a change in the sampled representative telemetric value can be detected. In response to detecting the change in the sampled representative telemetric value, one or more of the two or more telemetric values represented by the representative telemetric value can be sampled in addition to the representative telemetric value.

According to one aspect, the control circuit can further cause the telemetry monitor device to define an indicator function for the representative telemetric value and wherein detecting the change in the sampled representative telemetric value can be based on the indicator function for the representative telemetric value. Defining the indicator function for the representative telemetric value can comprise defining a predefined threshold value for each representative telemetric value. Additionally, or alternatively, defining the indicator function for the representative telemetric value can comprise defining an expected value for the sampled representative telemetric value based on statistical analysis of historical data for the sampled representative telemetric value.

According to another embodiment, a computing data center can comprise a communication network, a plurality of computing devices coupled with the communication network, and a telemetry monitor device comprising a control circuit controlling operation of the telemetry monitoring device. The control circuit can cause the telemetry monitoring device to identify a representative telemetric value for two or more telemetric values collected from computing devices coupled with the communication network.

According to one aspect, identifying the representative telemetric value for two or more telemetric values collected from the computing devices can comprise defining a graph representing the two or more telemetric values, wherein the graph comprises a plurality of nodes representing the two or more telemetric values and one or more edges connecting the plurality of nodes, and wherein each edge represents a correlation between the plurality of nodes. One or more cliques within the graph can be identified based on the correlation between the plurality of nodes represented by the edges of the graph and the representative telemetric value for two or more telemetric values collected from the computing devices can be identified based on the identified one or more cliques.

According to another aspect, identifying the representative telemetric value for two or more telemetric values collected from the computing devices can be based on machine learning-based clustering of the two or more telemetric values.

According to another aspect, identifying the representative telemetric value for two or more telemetric values collected from the computing devices can comprise receiving a definition of the representative telemetric value from a domain expert.

One or more telemetric values can be sampled from the representative telemetric value of the two or more computing devices in each of the plurality of groups and a change in the sampled representative telemetric value can be detected. In response to detecting the change in the sampled representative telemetric value, one or more of the two or more telemetric values represented by the representative telemetric value can be sampled in addition to the representative telemetric value.

According to one aspect, the control circuit can further cause the telemetry monitor device to define an indicator function for the representative telemetric value and wherein detecting the change in the sampled representative telemetric value can be based on the indicator function for the representative telemetric value. Defining the indicator function for the representative telemetric value can comprise defining a predefined threshold value for each representative telemetric value. Additionally, or alternatively, defining the indicator function for the representative telemetric value can comprise defining an expected value for the sampled representative telemetric value based on statistical analysis of historical data for the sampled representative telemetric value.

According to another embodiment, a method for monitoring a plurality of computing devices on a network can comprise identifying a representative telemetric value for two or more telemetric values collected from the computing devices coupled with the communication network. Identifying the representative telemetric value for two or more telemetric values collected from the computing devices can comprise defining a graph representing the two or more telemetric values, wherein the graph comprises a plurality of nodes representing the two or more telemetric values and one or more edges connecting the plurality of nodes, and wherein each edge represents a correlation between the plurality of nodes, identifying one or more cliques within the graph based on the correlation between the plurality of nodes represented by the edges of the graph, and identifying the representative telemetric value for two or more telemetric values collected from the computing devices based on the identified one or more cliques. Additionally, or alternatively, identifying the representative telemetric value for two or more telemetric values collected from the computing devices can be based on machine learning-based clustering of the two or more telemetric values and/or receiving a definition of the representative telemetric value from a domain expert.

One or more telemetric values can be sampled from the representative telemetric value of the two or more computing devices in each of the plurality of groups and a change can be detected in the sampled representative telemetric value. For example, an indicator function can be defined for each group of the plurality of groups and detecting the change in the sampled representative telemetric value can be based on the indicator function for the representative telemetric value. In response to detecting the change in the sampled representative telemetric value, one or more of the two or more telemetric values represented by the representative telemetric value can be sampled in addition to the representative telemetric value.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
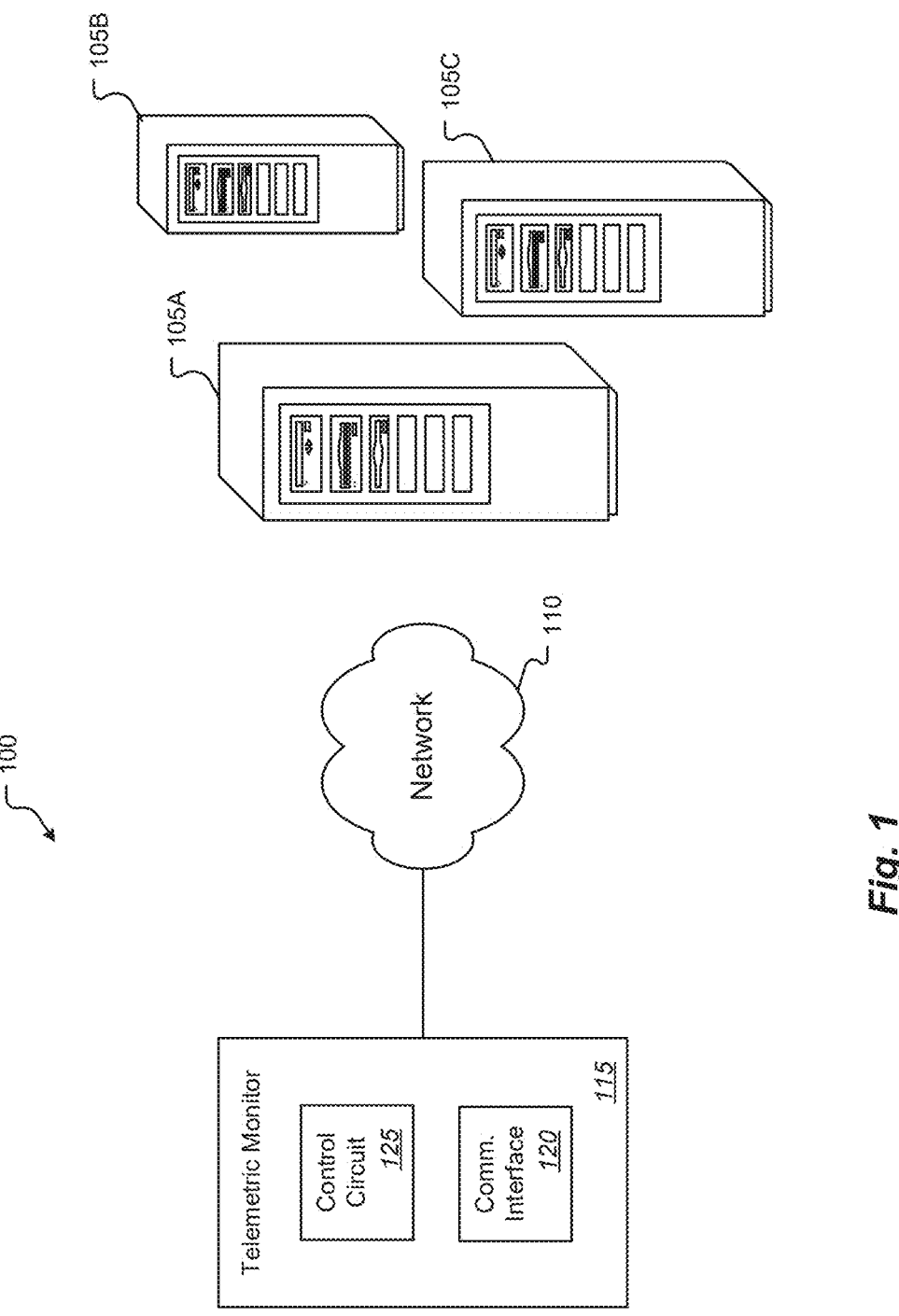
FIG. 1 is a block diagram illustrating an exemplary environment in which embodiments of the present disclosure can be implemented.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not to be deemed "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-9, various systems and methods for sampling telemetric values of computing devices in an efficient manner will be described. Embodiments described herein are directed to sampling counters & gauges of computing devices in a network, data center, etc. in a way that reduces redundant and non-informative signals, while being adaptive when sampling with high granularity desirable. According to one embodiment, counters can be correlated with each other, sharing residual information, and therefore, sampling only a subset of them, or a "representative" can be sufficient in representing a current state. When there is a notable change in the representative, the telemetry sampling procedure can increase its granularity and sample not only the representative but also the underlying group of telemetric values.

FIG. 1 is a block diagram illustrating an exemplary environment in which embodiments of the present disclosure can be implemented. As illustrated in this example, the environment 100 can comprise a number of computing devices 105A-105C coupled with a communication network 110. The computing devices 105A-105C can comprise any of a variety of servers and/or other computing devices as known in the art and which may be found, for example, in a data center or other installation. The communication network 110 can comprise any one or more wired and/or wireless, local-area and/or wide-area networks as known in the art including, but not limited to, the Internet.

The environment 100 further comprises a telemetric monitor 115 coupled with the communication network via a communication interface 120 such as an Ethernet card, for example. The telemetric monitor 115 can further comprise a control circuit 125 controlling operation of the telemetric monitor 115. The control circuit 125 can comprise a Central Processing Unit (CPU), e.g., one or more microprocessors, or similar components as known in the art. Generally speaking, the control circuit 125 can cause the telemetric monitor 115 to collect and monitor any one or more telemetric values from the computing devices 105A-105C. Examples of such telemetric values can include, but are not limited to, various counters, timers, temperatures, resource utilization values, etc.

Embodiments of the present disclosure are directed to sampling telemetric values in a way that reduces redundant and non-informative values while being adaptive when higher granularity is desired such as when, for example, a change or anomaly is detected. According to one embodiment, telemetric values can be correlated with each other and a subset or a representative of the correlated values can be sampled to represent a current state of a set of monitored computing devices. When there is a notable change in the representative, the telemetry monitor 115 can increase the granularity of sampling by sampling not only the representative but also the underlying or represented group of telemetric values.

More specifically, embodiments of the present disclosure can comprise a learning phase and a telemetry collection phase. The learning phase can comprise a counter splitting or representative identification process. In this representative identification process, the telemetric values can be split into groups and a representative value can be assigned for each group. The learning phase can further comprise an indicator function definition process responsible for defining or learning an indicator function, e.g., a Boolean function that outputs "true" for when higher granularity sampling may be desired. For example, this function may be based on a threshold or limit for a particular telemetric value. The telemetry collection phase can then comprise collecting and monitoring telemetry values based on for a group of telemetric values based on the identified representative value and the indicator function. When the indicator function indicates a change or anomaly in the representative value, the telemetry collection phase can then collect and monitor telemetry values in addition to the representative value.

Figure 2:
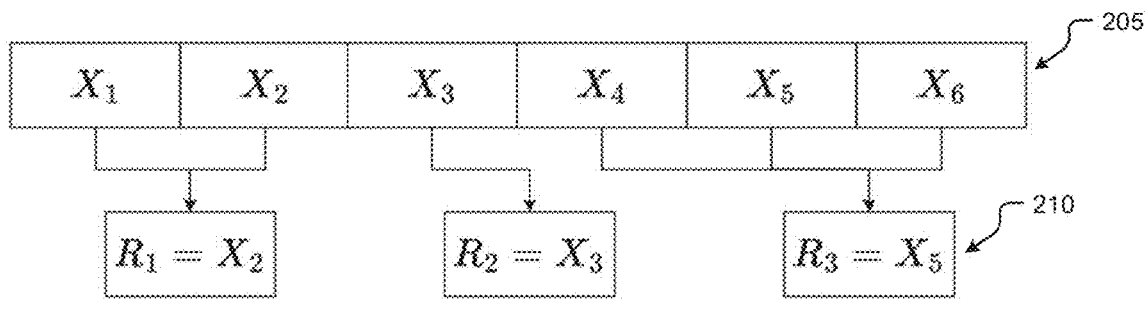
FIG. 2 is a is a block diagram conceptually illustrating identifying a representative telemetric value from a group of devices for telemetric sampling according to one embodiment of the present disclosure.
Figure 3:
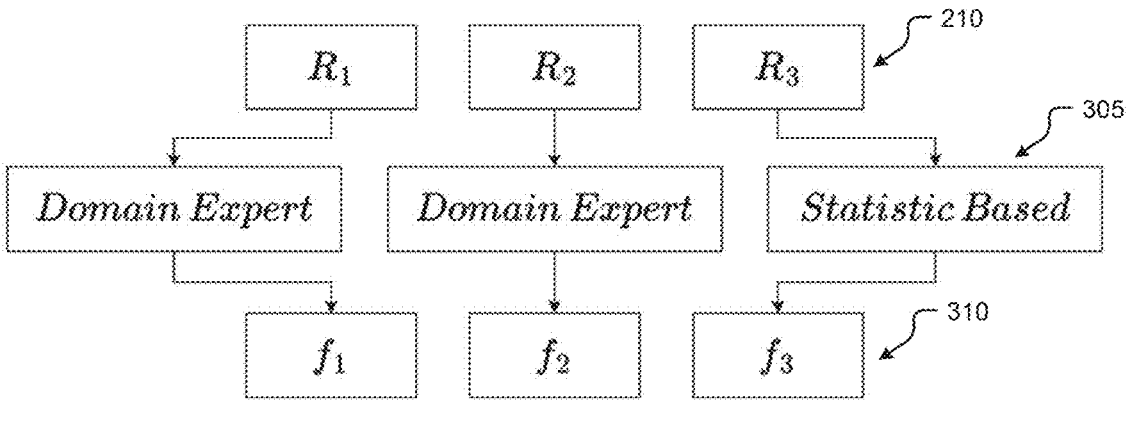
FIG. 3 is a block diagram conceptually illustrating definition of an indicator functions for a group of telemetric values according to one embodiment of the present disclosure.
Figure 4:
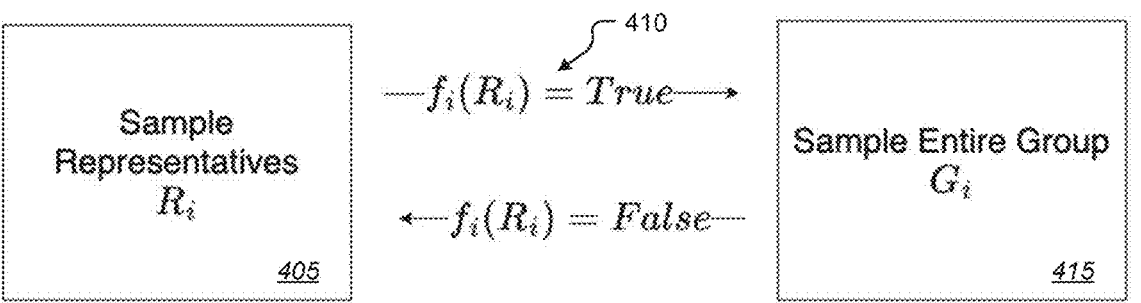
FIG. 4 is a block diagram conceptually illustrating telemetry collection for a group of telemetric values according to one embodiment of the present disclosure.

According to one embodiment, the learning phase and telemetry collection phase processes described above can be implemented in a Single-Level Hierarchical Sampling (SLHS) algorithm. FIGS. 2-4 illustrate such a process. More specifically, FIG. 2 is a is a block diagram conceptually illustrating identifying a representative telemetric value from a group of devices for telemetric sampling according to one embodiment of the present disclosure. As illustrated in this example, a set of collected telemetric values 205, e.g., $X_1$, $X_2$, $X_3$, $X_4$, $X_5$, and $X_6$, can be analyzed and grouped and representative values 210 can be identified for each group. As illustrated here, the group consisting of telemetric values $X_1$ and $X_2$ can be represented ($R_1$) by value $X_2$. Similarly, telemetric values $X_4$, $X_5$, and $X_6$ can be represented ($R_3$) by value $X_5$.

According to one embodiment, identifying a representative telemetric value for a group of telemetric values can be performed using a graph-based clique algorithm. Additionally, or alternatively, identifying the representative telemetric value for two or more telemetric values can be based on machine learning-based clustering of the two or more telemetric values in each of the plurality of groups and/or receiving a definition of the group from a domain expert. Additional details of such processes will be described further below.

FIG. 3 is a block diagram conceptually illustrating definition of an indicator functions for a group of telemetric values according to one embodiment of the present disclosure. As illustrated in this example, one of a variety of processes 305 may be applied to define an indicator function 310 for each representative telemetric value 210. Defining the indicator function 310 for each representative telemetric value 210 can comprise defining a predefined threshold value for each representative telemetric value. Additionally, or alternatively, defining the indicator function for representative telemetric value can comprise defining an expected value for the sampled representative telemetric value based on statistical analysis of historical data for the sampled representative telemetric value.

FIG. 4 is a block diagram conceptually illustrating telemetry collection for a group of telemetric values according to one embodiment of the present disclosure. As illustrated in this example, telemetric collection can comprise sampling 405 each representative telemetric value 205 and applying the indicator function 310 for that value. If the indicator function is triggered 310 for a particular representative telemetric value, sampling 410 can be expanded to include additional collected telemetric values, e.g., the telemetric values in the group represented by the representative telemetric value that triggered the indicator function.

Figure 5:
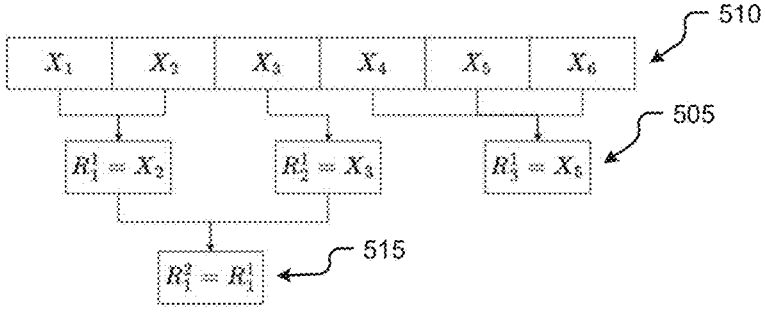
FIG. 5 is a is a block diagram conceptually illustrating identifying a representative telemetric value from a group of devices for multi-level, hierarchical telemetric sampling according to one embodiment of the present disclosure.
Figure 6:
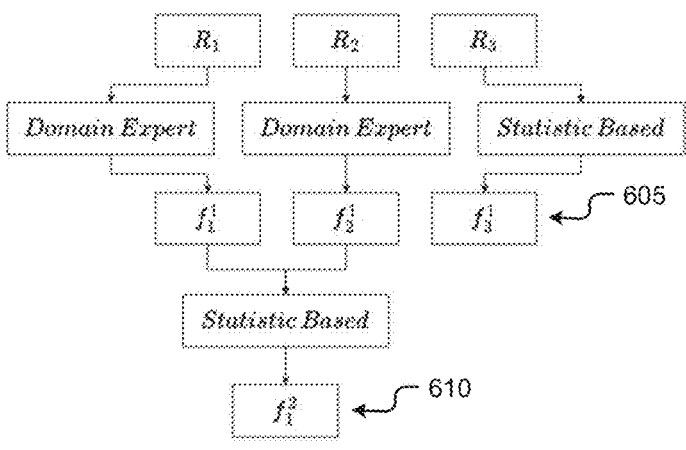
FIG. 6 is a block diagram conceptually illustrating definition of an indicator functions for multi-level, hierarchical telemetric sampling according to one embodiment of the present disclosure.
Figure 7:
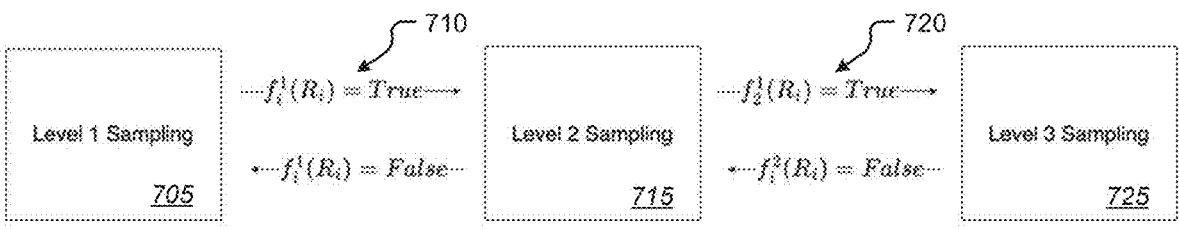
FIG. 7 is a block diagram conceptually illustrating multi-level, hierarchical telemetric sampling for a group of telemetric values according to one embodiment of the present disclosure.

As noted, the examples above illustrate the SLHS algorithm according to one embodiment of the present disclosure. According to another embodiment, a Multi-level Hierarchical Sampling algorithm can also be used. FIGS. 5-7 illustrate such a process. More specifically, FIG. 5 is a is a block diagram conceptually illustrating identifying a representative telemetric value from a group of devices for multi-level, hierarchical telemetric sampling according to one embodiment of the present disclosure. As illustrated in this example, representative telemetric values 505 can be identified for a set of collected telemetric values 510 at a first level as described above. Applying similar processes to representative telemetric values 505 at the first level, representatives 515 for the representative telemetric values 505 at the first level can be identified at a second level.

FIG. 6 is a block diagram conceptually illustrating definition of an indicator functions for multi-level, hierarchical telemetric sampling according to one embodiment of the present disclosure. As illustrated in this example as similar to the described above, a set of indicator functions 605 can be defined for the representative telemetric values 510 at the first level in a manner as described above for the SLHS algorithm. Such processes can also be applied to define an indicator function 610 for representative telemetric values 515 at a second, or subsequent, level of the hierarchy.

FIG. 7 is a block diagram conceptually illustrating multi-level, hierarchical telemetric sampling for a group of telemetric values according to one embodiment of the present disclosure. As illustrated in this example, sampling 705 can be performed on representative telemetric values 515 for a first, i.e., top, level of the hierarchy. If the indicator function 610 for that level is triggered indicating a change or anomaly, sampling 715 can then be expanded to include the representative telemetric values 505 and the next lower level of the hierarchy. Similarly, if the indicator function 605 for that level of the hierarchy is triggered, sampling 725 can be further expanded, e.g., to include all sampled telemetric values 510 as illustrated in this example or to continue down the hierarchical levels as may be defined. It should be noted and understood that while only two levels are shown in FIGS. 5-7 for the sake of explanation, any number of hierarchical levels may be utilized in the same way depending upon the exact implementation.

Figure 8:
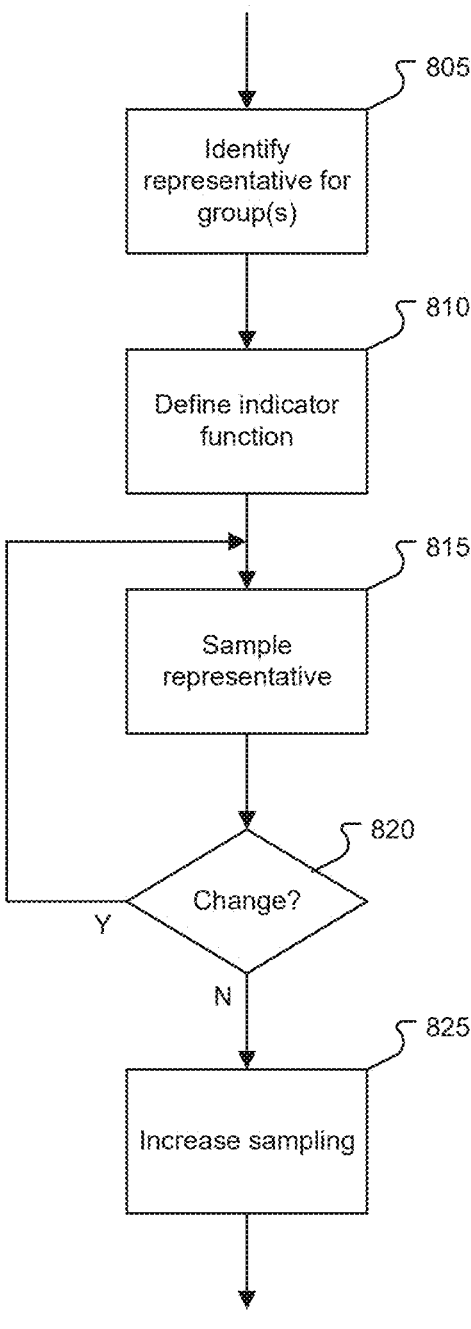
FIG. 8 is a flowchart illustrating an exemplary process for telemetric sampling according to one embodiment of the present invention.

FIG. 8 is a flowchart illustrating an exemplary process for telemetric sampling according to one embodiment of the present invention. As illustrated in this example, monitoring a plurality of computing devices on a network can comprise identifying 805 a representative telemetric value for two or more telemetric values collected from computing devices 105A-105C coupled with the communication network 110. As noted above, identifying 805 a representative telemetric value for a group of telemetric values can be performed using a graph-based clique algorithm. Additional details of an exemplary process for identifying 805 a representative telemetric value for a group of telemetric values in this manner will be described below with reference to FIG. 9. Additionally, or alternatively, identifying 805 the representative telemetric value for two or more telemetric values collected from the computing devices can be based on machine learning-based clustering of the two or more telemetric values and/or receiving a definition of the representative telemetric value from a domain expert. Additional details of an exemplary process for machine learning-based clustering will be described below with reference to FIG. 10.

An indicator function can be defined 810 for each group of the plurality of groups. Defining 810 the indicator function for the representative telemetric value can comprise defining a predefined threshold value for each representative telemetric value. Additionally, or alternatively, defining 810 the indicator function for the representative telemetric value can comprise defining an expected value for the sampled representative telemetric value based on statistical analysis of historical data for the sampled representative telemetric value.

One or more telemetric values can then be sampled 815 from the representative telemetric value of the two or more computing devices in each of the plurality of groups and a determination 820 can be made as to whether a change has be detected in the sampled representative telemetric value. Determining 820 whether a change has been detected in the sampled representative telemetric value can be based on the indicator function for the representative telemetric value. In response to detecting the change in the sampled representative telemetric value, sampling can be increased 825, i.e., one or more of the two or more telemetric values represented by the representative telemetric value can be sampled in addition to the representative telemetric value.

As noted above, and according to one embodiment, multi-level, hierarchical sampling can be performed. In such cases, identifying 805 the representative telemetric value for two or more telemetric values collected from the computing devices and defining 810 an indicator function for the representative telemetric value can be repeated for any desired number of levels up to and including representing the entirety of the plurality of computing devices, e.g., all devices in a data center, with a single representative and indicator function for a given telemetric value. When a determination 820 is made that a change has been detected, increasing 825 sampling for the changed telemetric value can then be performed iteratively for any number of depth levels, e.g., until the source of the change is determined or identified.

Figure 9:
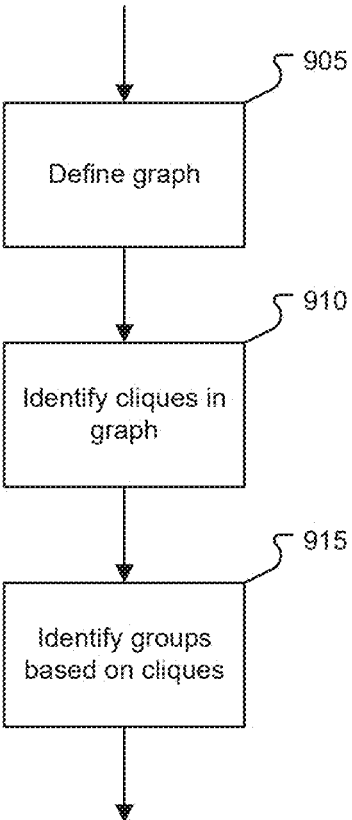
FIG. 9 is a flowchart illustrating an exemplary process for identifying a representative telemetric value for a group of telemetric values according to one embodiment of the present invention.

FIG. 9 is a flowchart illustrating an exemplary process for identifying a representative telemetric value for a group of telemetric values according to one embodiment of the present invention. More specifically, this example illustrates an exemplary process for identifying a representative telemetric value for a group of telemetric values using a graph-based clique algorithm. As illustrated in this example, identifying the representative telemetric value for two or more telemetric values collected from the computing devices can comprise defining 905 a weighted graph representing the two or more telemetric values, wherein the graph comprises a plurality of nodes representing the two or more telemetric values and one or more edges connecting the plurality of nodes. Each edge can represent a weight, i.e., a correlation between the plurality of nodes. One or more cliques can then be identified 910 within the graph based on the correlation between the plurality of nodes represented by the edges of the graph. The representative telemetric value for two or more telemetric values collected from the computing devices can then be identified 915 or selected based on the identified 910 one or more cliques.

Figure 10:
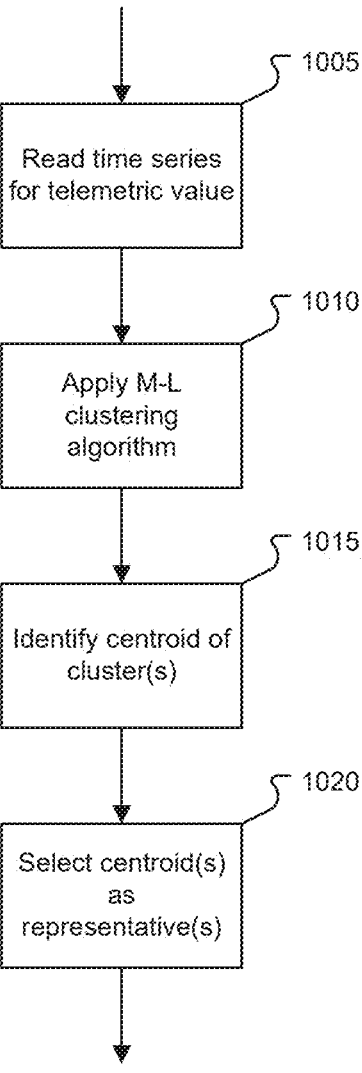
FIG. 10 is a flowchart illustrating an exemplary process for identifying a representative telemetric value for a group of telemetric values according to another embodiment of the present invention.

FIG. 10 is a flowchart illustrating an exemplary process for identifying a representative telemetric value for a group of telemetric values according to another embodiment of the present invention. More specifically, this example illustrates an exemplary process for identifying a representative telemetric value for a group of telemetric values using a graph-based clique algorithm. As illustrated in this example, identifying the representative telemetric value for two or more telemetric values collected from the computing devices can comprise reading 1005 a time series set of values for a selected telemetric value. A machine-learning clustering algorithm can be applied 1010 to the time series set of values to identify one or more clusters of values within the time series set of values. A centroid can be identified 1015 for each cluster and the centroid, i.e., the computing device from which the value at the centroid was collected, can be selected 1020 as the representative for the group of computing device from which the values in that cluster were collected.

It should be noted that numerous variations in the structure, function, order of operations, and/or other aspects of the various embodiments described herein are contemplated. The operations described above for exemplary processes for synchronizing clocks between computing devices can be performed in different order and each operation need not depend on a prior event or operation. For example, the sending of synchronization messages can be initiated by any device at any time and does not need to happen in response to those events receiving a synchronization message or other event. Also, the process for setting the clock does not need to be executed in response to completing the dialogs. For example, the task of measuring the clock offset can be performed in one process while the task of setting the clock based on the clock offset could be done in the second process that functions asynchronously relative to the first process. Other such variations are further contemplated and are considered to be within the scope of the present disclosure.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A telemetry monitor device comprising:

a communication interface coupled with a communication network; and a control circuit controlling operation of the telemetry monitoring device, wherein the control circuit causes the telemetry monitoring device to:

identify a representative telemetric value for two or more telemetric values collected from computing devices coupled with the communication network;

sample, through the communication interface, the representative telemetric value from the computing devices;

detect a change in the sampled representative telemetric value; and in response to detecting the change in the sampled representative telemetric value, sample, through the communication interface, one or more of the two or more telemetric values represented by the representative telemetric value in addition to the representative telemetric value.

2. The telemetry monitor device of claim 1, wherein identifying the representative telemetric value for two or more telemetric values collected from the computing devices comprises:

defining a graph representing the two or more telemetric values, wherein the graph comprises a plurality of nodes representing the two or more telemetric values and one or more edges connecting the plurality of nodes, and wherein each edge represents a correlation between the plurality of nodes;

identifying one or more cliques within the graph based on the correlation between the plurality of nodes represented by the edges of the graph; and identifying the representative telemetric value for two or more telemetric values collected from the computing devices based on the identified one or more cliques.

3. The telemetry monitor device of claim 1, wherein identifying the representative telemetric value for two or more telemetric values collected from the computing devices is based on machine learning-based clustering of the two or more telemetric values.

4. The telemetry monitor device of claim 1, wherein identifying the representative telemetric value for two or more telemetric values collected from the computing devices comprises receiving a definition of the representative telemetric value from a domain expert.

5. The telemetry monitor device of claim 1, wherein the control circuit further causes the telemetry monitor device to define an indicator function for the representative telemetric value and wherein detecting the change in the sampled representative telemetric value is based on the indicator function for the representative telemetric value.

6. The telemetry monitor device of claim 5, wherein defining the indicator function for the representative telemetric value comprises defining a predefined threshold value for each representative telemetric value.

7. The telemetry monitor device of claim 5, wherein defining the indicator function for the representative telemetric value comprises defining an expected value for the sampled representative telemetric value based on statistical analysis of historical data for the sampled representative telemetric value.

8. The telemetry monitor device of claim 1, wherein identifying the representative telemetric value for two or more telemetric values collected from the computing devices further comprises identifying a representative telemetric value of two or more representative values in each of a plurality of hierarchical levels.

9. A computing data center comprising:

a communication network;

a plurality of computing devices coupled with the communication network; and a telemetry monitor device comprising a control circuit controlling operation of the telemetry monitoring device, wherein the control circuit causes the telemetry monitoring device to:

identify a representative telemetric value for two or more telemetric values collected from computing devices coupled with the communication network;

sample, through the communication network, the representative telemetric value from the computing devices;

detect a change in the sampled representative telemetric value; and in response to detecting the change in the sampled representative telemetric value, sample, through the communication network, one or more of the two or more telemetric values represented by the representative telemetric value in addition to the representative telemetric value.

10. The computing data center of claim 9, wherein identifying the representative telemetric value for two or more telemetric values collected from the computing devices comprises:

defining a graph representing the two or more telemetric values, wherein the graph comprises a plurality of nodes representing the two or more telemetric values and one or more edges connecting the plurality of nodes, and wherein each edge represents a correlation between the plurality of nodes;

identifying one or more cliques within the graph based on the correlation between the plurality of nodes represented by the edges of the graph; and identifying the representative telemetric value for two or more telemetric values collected from the computing devices based on the identified one or more cliques.

11. The computing data center of claim 9, wherein identifying the representative telemetric value for two or more telemetric values collected from the computing devices is based on machine learning-based clustering of the two or more telemetric values.

12. The computing data center of claim 9, wherein identifying the representative telemetric value for two or more telemetric values collected from the computing devices comprises receiving a definition of the representative telemetric value from a domain expert.

13. The computing data center of claim 9, wherein the control circuit further causes the telemetry monitor device to define an indicator function for the representative telemetric value and wherein detecting the change in the sampled representative telemetric value is based on the indicator function for the representative telemetric value.

14. The computing data center of claim 13, wherein defining the indicator function for the representative telemetric value comprises defining a predefined threshold value for each representative telemetric value.

15. The computing data center of claim 13, wherein defining the indicator function for the representative telemetric value comprises defining an expected value for the sampled representative telemetric value based on statistical analysis of historical data for the sampled representative telemetric value.

16. A method for monitoring a plurality of computing devices on a network, the method comprising:

identifying, by a processor of a telemetry monitor, a representative telemetric value for two or more telemetric values collected from computing devices coupled with the network;

sampling, by the processor of the telemetry monitor, the representative telemetric value from the computing devices;

detecting, by the processor of the telemetry monitor, a change in the sampled representative telemetric value; and in response to detecting the change in the sampled representative telemetric value, sampling, by the processor of the telemetry monitor, one or more of the two or more telemetric values represented by the representative telemetric value in addition to the representative telemetric value.

17. The method of claim 16, wherein identifying the representative telemetric value for two or more telemetric values collected from the computing devices comprises:

defining a graph representing the two or more telemetric values, wherein the graph comprises a plurality of nodes representing the two or more telemetric values and one or more edges connecting the plurality of nodes, and wherein each edge represents a correlation between the plurality of nodes;

identifying one or more cliques within the graph based on the correlation between the plurality of nodes represented by the edges of the graph; and identifying the representative telemetric value for two or more telemetric values collected from the computing devices based on the identified one or more cliques.

18. The method of claim 16, wherein identifying the representative telemetric value for two or more telemetric values collected from the computing devices is based on machine learning-based clustering of the two or more telemetric values.

19. The method of claim 16, wherein identifying the representative telemetric value for two or more telemetric values collected from the computing devices comprises receiving a definition of the representative telemetric value from a domain expert.

20. The method of claim 16, further comprising defining, by the processor of the telemetry monitor, an indicator function for the representative telemetric value and wherein detecting the change in the sampled representative telemetric value is based on the indicator function for the representative telemetric value.

\* \* \* \* \*